(12) United States Patent
Vander Lind

(10) Patent No.: US 9,896,201 B2
(45) Date of Patent: *Feb. 20, 2018

(54) KITE CONFIGURATION AND FLIGHT STRATEGY FOR FLIGHT IN HIGH WIND SPEEDS

(71) Applicant: X Development LLC, Moutain View, CA (US)

(72) Inventor: Damon Vander Lind, Oakland, CA (US)

(73) Assignee: X Development LLC, Mountain View, CA (US)

(*) Notice: Subject to any disclaimer, the term of this patent is extended or adjusted under 35 U.S.C. 154(b) by 595 days.

This patent is subject to a terminal disclaimer.

(21) Appl. No.: 14/584,536

(22) Filed: Dec. 29, 2014

(65) Prior Publication Data

US 2015/0251754 A1 Sep. 10, 2015

Related U.S. Application Data

(63) Continuation of application No. 13/288,527, filed on Nov. 3, 2011, now Pat. No. 8,922,046.

(Continued)

(51) Int. Cl.
*A63H 27/00* (2006.01)
*B64C 31/06* (2006.01)
(Continued)

(52) U.S. Cl.
CPC .............. *B64C 31/06* (2013.01); *B64C 13/24* (2013.01); *B64C 39/022* (2013.01); *F03D 1/02* (2013.01);
(Continued)

(58) Field of Classification Search
CPC ............ C12Q 1/6827; C12Q 2537/164; C12Q 1/6883; C12Q 1/6886; C12Q 2600/154;
(Continued)

(56) References Cited

U.S. PATENT DOCUMENTS 4,114,837 A * 9/1978 Pavlecka .................. B64B 1/34
244/125
4,129,272 A * 12/1978 Jones .................... B64C 31/036
244/145

(Continued)

FOREIGN PATENT DOCUMENTS

JP 2002165346 6/2002
WO 2012/061598 5/2012

OTHER PUBLICATIONS

European Patent Office, Extended European Search report dated Aug. 13, 2015, issued in connection with European Application No. 11838810.7, 8 pages.

(Continued)

*Primary Examiner* — Medhat Badawi
(74) *Attorney, Agent, or Firm* — McDonnell Boehnen Hulbert & Berghoff LLP

(57) ABSTRACT

An airborne tethered flight system including a base unit, a tether having a first end attached to the base unit and a second end attached to a kite, wherein the kite comprises a main wing, a tail wing, and a tail boom attached to said main wing on a first end, said tail boom coupled to said tail wing on a second end, a plurality of vertical pylons attached to the main wing, said pylons comprising vertical airfoils adapted to provide lift, turbine driven generators mounted on the vertical airfoils attached to the main wing, and an additional vertical airfoil extending between the tail boom and tail wing.

19 Claims, 14 Drawing Sheets

Related U.S. Application Data

(60) Provisional application No. 61/409,894, filed on Nov. 3, 2010.

(51) Int. Cl.

| | |
|---|---|
| *F03D 5/00* | (2006.01) |
| *F03D 7/00* | (2006.01) |
| *B64C 13/24* | (2006.01) |
| *B64C 39/02* | (2006.01) |
| *F03D 1/02* | (2006.01) |
| *F03D 13/20* | (2016.01) |
| *G05D 1/08* | (2006.01) |
| *F03D 9/25* | (2016.01) |

(52) U.S. Cl.
CPC ............. *F03D 5/00* (2013.01); *F03D 7/00* (2013.01); *F03D 9/25* (2016.05); *F03D 13/20* (2016.05); *G05D 1/0866* (2013.01); *F05B 2240/921* (2013.01); *Y02E 10/70* (2013.01); *Y02E 10/723* (2013.01); *Y02E 10/725* (2013.01)

(58) Field of Classification Search
CPC ... C12Q 2600/172; B64C 13/24; B64C 31/06; B64C 39/022; F03D 1/02; F03D 5/00; F03D 7/00; F03D 9/25; F05B 2240/921; G05D 1/0866; Y02E 10/70; Y02E 10/723; Y02E 10/725
See application file for complete search history.

(56) References Cited

U.S. PATENT DOCUMENTS

| | | | |
|---|---|---|---|
| 4,166,596 A * | 9/1979 | Mouton, Jr. | B64B 1/50 244/30 |
| 4,450,364 A * | 5/1984 | Benoit | F03D 13/20 244/25 |
| 6,925,949 B1 * | 8/2005 | Phillips | B63H 9/0685 114/102.1 |
| 7,582,981 B1 * | 9/2009 | Meller | F03D 1/025 290/44 |
| 8,800,931 B2 * | 8/2014 | Vander Lind | A63H 27/002 244/154 |
| 8,922,046 B2 * | 12/2014 | Vander Lind | B64C 31/06 290/55 |
| 9,126,675 B2 * | 9/2015 | Chubb | B64C 39/022 |
| 9,126,682 B2 * | 9/2015 | Chubb | B64C 39/022 |
| 9,169,013 B2 * | 10/2015 | Jensen | B64C 39/022 |
| 9,464,624 B2 * | 10/2016 | Calverley | F03D 5/00 |
| 9,523,982 B2 * | 12/2016 | Hastings | A63H 30/02 |
| 9,637,231 B2 * | 5/2017 | Chubb | B64C 39/022 |
| 2001/0017219 A1 * | 8/2001 | Kikuchi | H01B 5/104 174/102 R |
| 2007/0176432 A1 * | 8/2007 | Rolt | B64C 39/022 290/55 |
| 2008/0006743 A1 * | 1/2008 | Miller | B64C 39/024 244/53 R |
| 2008/0048453 A1 * | 2/2008 | Amick | B82Y 30/00 290/44 |
| 2008/0116315 A1 * | 5/2008 | Hamburg | B64B 1/50 244/30 |
| 2009/0072092 A1 * | 3/2009 | Griffith | B64C 31/06 244/155 A |
| 2009/0127861 A1 * | 5/2009 | Sankrithi | F03B 13/264 290/54 |
| 2009/0289148 A1 * | 11/2009 | Griffith | B63H 9/0685 244/155 R |
| 2010/0013226 A1 * | 1/2010 | Blumer | B64B 1/50 290/44 |
| 2010/0026007 A1 * | 2/2010 | Bevirt | B64C 31/06 290/55 |
| 2010/0032947 A1 * | 2/2010 | Bevirt | F03D 1/065 290/44 |
| 2010/0032948 A1 * | 2/2010 | Bevirt | F03D 1/00 290/44 |
| 2010/0117363 A1 * | 5/2010 | Meller | F03D 1/025 290/52 |
| 2010/0193625 A1 * | 8/2010 | Sommer | B64C 37/02 244/2 |
| 2010/0221112 A1 * | 9/2010 | Bevirt | F03D 5/00 416/135 |
| 2010/0230546 A1 | 9/2010 | Bevirt et al. | |
| 2010/0232988 A1 * | 9/2010 | Creighton | F03D 5/00 417/334 |
| 2010/0259050 A1 * | 10/2010 | Meller | F03D 1/025 290/55 |
| 2010/0283253 A1 * | 11/2010 | Bevirt | F03D 1/02 290/55 |
| 2010/0295320 A1 * | 11/2010 | Bevirt | B64C 39/022 290/55 |
| 2010/0295321 A1 | 11/2010 | Bevirt | |
| 2010/0308174 A1 * | 12/2010 | Calverley | B64C 27/02 244/155 A |
| 2011/0042508 A1 * | 2/2011 | Bevirt | B64C 15/00 244/12.4 |
| 2011/0042509 A1 | 2/2011 | Bevirt et al. | |
| 2011/0042510 A1 * | 2/2011 | Bevirt | B64C 29/0033 244/12.4 |
| 2011/0121570 A1 * | 5/2011 | Bevirt | F03D 5/06 290/44 |
| 2011/0127775 A1 | 6/2011 | Bevirt | |
| 2011/0174932 A1 * | 7/2011 | Tellem | B64C 31/06 244/155 R |
| 2011/0186687 A1 * | 8/2011 | Elder | B64C 31/06 244/155 A |
| 2011/0260462 A1 * | 10/2011 | Vander Lind | A63H 27/002 290/55 |
| 2011/0266395 A1 * | 11/2011 | Bevirt | F03D 5/00 244/155 R |
| 2011/0267241 A1 * | 11/2011 | Grimm | B64B 1/02 343/706 |
| 2012/0049533 A1 * | 3/2012 | Kelly | F03D 5/04 290/55 |
| 2012/0086210 A1 * | 4/2012 | Gray | F03D 5/00 290/55 |
| 2012/0286102 A1 | 11/2012 | Sinha et al. | |
| 2012/0287274 A1 * | 11/2012 | Bevirt | H04N 7/185 348/144 |
| 2012/0319407 A1 * | 12/2012 | Glass | F03D 1/04 290/55 |

OTHER PUBLICATIONS

International Searching Authority, International Search Report for PCT/US2011/059146, dated Mar. 16, 2012, 2 pages.
International Searching Authority, Written Opinion for PCT/US2011/059146, dated Mar. 16, 2012, 6 pages.

* cited by examiner

KITE CONFIGURATION AND FLIGHT STRATEGY FOR FLIGHT IN HIGH WIND SPEEDS

CROSS-REFERENCE TO RELATED APPLICATIONS

This application claims priority to U.S. Provisional Patent Application No. 61/409,894 to Vander Lind, filed Nov. 3, 2010, which is hereby incorporated by reference in its entirety. This application also claims priority to, and is a continuation of, U.S. patent application Ser. No. 13/288,527 entitled "KITE CONFIGURATION AND FLIGHT STRATEGY FOR FLIGHT IN HIGH WIND SPEEDS" to Vander Lind, filed Nov. 3, 2011, issuing as U.S. Pat. No. 8,922,046 which application is hereby incorporated by reference in its entirety.

BACKGROUND

Field of the Invention

The present invention relates to a system and method of flying tethered vehicles in high wind speeds.

Description of Related Art

Crosswind kite systems comprising tethered wings (kites) can extract useful power from the wind for purposes such as, for example, generating electricity, lifting or towing objects or vehicles, etc. To provide or use consistent power, it may be desired to fly the kite in repeating trajectories (i.e., a limit cycle). It may also be desired to maintain the kite aloft and flying consistent trajectories during a large range of environmental conditions such as high wind speeds, large gusts, turbulent air, or variable wind conditions. However, with the typical crosswind kite system mode of operation, the inertial speed of the kite, the tension on the tether, the aerodynamic loads on the kite structure and the system power output increase as the wind speed increases. So, for example, a problem arises in times of high winds, when tether tension or kite structural load exceeds a safety limit. Therefore, an alternative mode of operation is desired so that a crosswind kite system can maintain bounded loads and bounded power generation while flying in limit cycles in high and changing winds.

SUMMARY OF THE INVENTION

A crosswind kite system adapted to operate in an alternate mode in high winds. The system may operate at reduced efficiency in high winds in order to moderate loading on the system during those high winds. The system may use multi-element airfoils which are actuated to reduce the coefficient of lift of the airfoils in order to moderate loading in high wind conditions. Other flight aspects may be controlled, including flying the crosswind kite in side slip to induce drag which may lower loading on the system.

DETAILED DESCRIPTION

Figure 1:
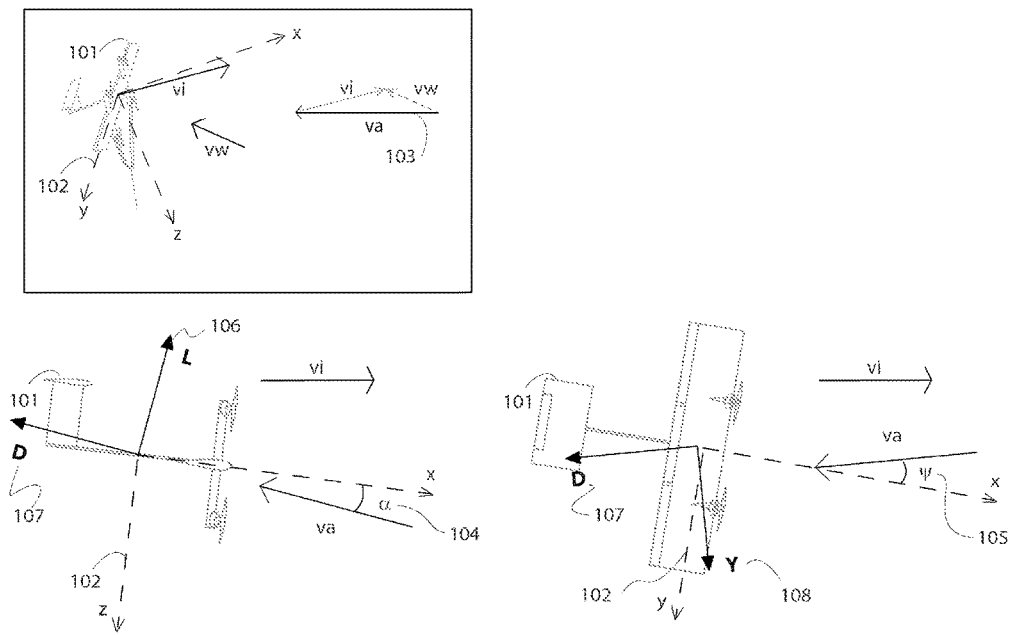
FIG. 1 is a schematic illustrating the kite body coordinates, the angles of attack and side-slip and the direction of the aerodynamic forces lift, drag and side-force.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents.

Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A physical configuration and flight control strategy for a crosswind kite system tolerant of extreme wind conditions are disclosed. The crosswind kite system comprises a kite with control surfaces, a tether, a mooring, and in some embodiments, hybrid rotors (i.e. a rotating aerodynamic surface or set of surfaces that can act both as a propeller and/or as a turbine). When used in an electrical power generation mode, this aspect performs as a turbine driven generator. When is used in a thrust delivery mode, this aspect performs as a motor driven propeller. A crosswind kite system might be used, for example, to generate electrical power from the wind, to lift a payload, and/or to tow an object or vehicle such as a boat or a car. In normal wind conditions, the kite is operated to fly along a flight path at an inertial speed of equal or greater magnitude than the wind speed. In some embodiments, in high or gusty wind conditions, control surface deflections and motor commands on the kite are adjusted to reduce the inertial speed and coefficient of lift of the kite and thus bound structural loads and power output within acceptable ranges, i.e., such that the system performs consistently within safety margins and without structural failure. Numerous aspects of the system aid in maintaining the flight path while the system configuration changes in order to reduce structural loads and limit the maximum power output in high or gusty winds while maintaining the capability of the system to follow the desired flight path. Through control surface deflections and motor commands, the kite is controlled to fly at large angles of side-slip in high winds, and the kite is configured such that a significant coefficient of side-force results from flight at large angles of side-slip. Side-force contributes to the turning force that maintains the kite on the desired flight path. In some embodiments, the kite is also configured such that, during flight at a large angle of side-slip, the shape and structural stiffness of the kite result in an increase in the coefficient of drag of the kite.

In typical horizontal flight, with no ambient wind, airflow over an airfoil flows directly front to back, in the negative x, or roll axis, direction. In the case of a tethered kite with airfoils flying in a circular pattern, the airflow is more complex. When flying in substantially circular flight path, as seen in the flight path 206 of FIG. 2, for example, a variety of attitudes are possible for the airfoiled kite. A range of attitude options are available which trade off between different control methods and attitudes used in the flight path. For example, one method is rolling the entire kite, and using a component of the lift of the main horizontal airfoil of the kite to provide the turning force, in order to follow a repeated flight path such as a circle, for example. This can be done using ailerons, or using the trailing elements of a multi-element airfoil, to roll the airfoiled kite. A possible drawback of this method is that should one desire to reduce lift of the airfoil, such as when high winds may be putting too much structural load on the system, this reduced lift would be seen in a reduced turning force, and thus the airfoiled wing would have to banked further in roll in order to achieve the desired flight path. Excessive banking may induce control system problems.

Another method would be to use vertical pylons which have airfoil elements. The airfoil elements of the pylons, which are nominally vertical with respect to the primary airfoil of the kite, can be used to provide lift in a nominal horizontal direction, which in the case of circular flight can be used to turn the kite along the desired flight path. This aspect leaves the attitude of the airfoiled kite flatter, with less roll, than in the case wherein all of the turning is induced by rolling the main horizontal airfoil of the kite. The airfoils of the vertical elements can be controlled with regard to their angle of attack by the use of a rudder. This approach has at least two advantages. Both of these advantages relate to the limiting of structural loads on the kite structure and the tether under high wind conditions. First, the use of the vertical airfoils of the pylons can, by the nature of the airfoil design chosen, significantly increase drag as the angle of attack of the vertical airfoils is increased. Increased drag may be a desired condition in high winds. Second, the use of the vertical airfoils of the pylons as opposed to the banking of the main airfoil of the kite may allow for decoupling to a large extent the lift of the main airfoil of the kite from the maintenance of the circular flight path, thus freeing up other control paradigms to reduce to lift of the main airfoil of the kite. The reduction of lift of the main airfoil of the kite may be a desired condition in high winds.

The aspects discussed above, and combinations of these aspects, may be used in a flight system and a flight strategy adapted for high speed winds. The aspects incorporate various features and strategies adapted to increase drag of the kite, and/or decrease the lift of the main airfoil of the kite. Combinations of these aspects may also be incorporated to yield a system that does not decrease the ability of the kite to be controlled.

In some embodiments, the tether is configured to exhibit higher drag at higher apparent wind speeds. To achieve this, the tether comprises a surface shape or texture which results in a Reynolds number-dependent drag coefficient (e.g. a roughened or dimpled surface) over all or a portion of its length. In a subset of those embodiments comprising hybrid rotors, the hybrid rotors are configured to generate power inefficiently in high winds. If the hybrid rotors are of fixed blade pitch, all or some subset of the hybrid rotors are operated at significantly reduced rotational rates, which, at the appropriate rotational rate, results in high system drag at the same power output. If the hybrid rotors are of a variable pitch or variable warp design, the hybrid rotors are operated at an inefficient combination of rotational rate and pitch or warp. For example, the hybrid rotors may be pitched or warped to have a high free-spinning, angular rate, but be controlled to operate at a lower angular rate, which provides the desired power output but is unstable with respect to velocity. In a subset of those embodiments comprising hybrid rotors connected to motors/generators, the torque commands to the motors/generators minimize a metric of the power variability and/or the load variability on the hybrid rotors. A suitable metric for performance variability is, for example, the standard deviation of power output. This occurs either at the level of individual motors/generators or at the level of the full set of motors/generators on the kite. In a subset of the embodiments in which the horizontal lifting surfaces comprise a main wing and a trailing horizontal tail, control surfaces on the main wing are used for high frequency structural load control due to their nonminimum-phase control over tether tension and spar load, and control surfaces on the horizontal tail are used for low frequency structural load control. In some embodiments, a subset of the horizontal lifting surfaces are outfitted with control surfaces which allow control over the stall coefficient of lift of the kite, and these control surfaces are deflected to reduce stall coefficient of lift or change the stall characteristics of the kite in high wind conditions.

FIG. 1 is an illustration of a kite 101 and the associated body coordinate system 102 according to some embodiments of the present invention. The velocity va of the airflow with respect to the kite 101 is the vector sum 103 of the velocity of the wind vw minus the inertial velocity vi of kite 101. FIG. 1 also shows the angle of attack 104 (a) and the angle of side-slip 105 (y) of the kite 101, which are defined with respect to the relative airflow va. The direction of flight vi and the directions of the aerodynamic forces lift (L) 106, drag (D) 107 and side-force (Y) 108 are also indicated in FIG. 1.

Figure 2:
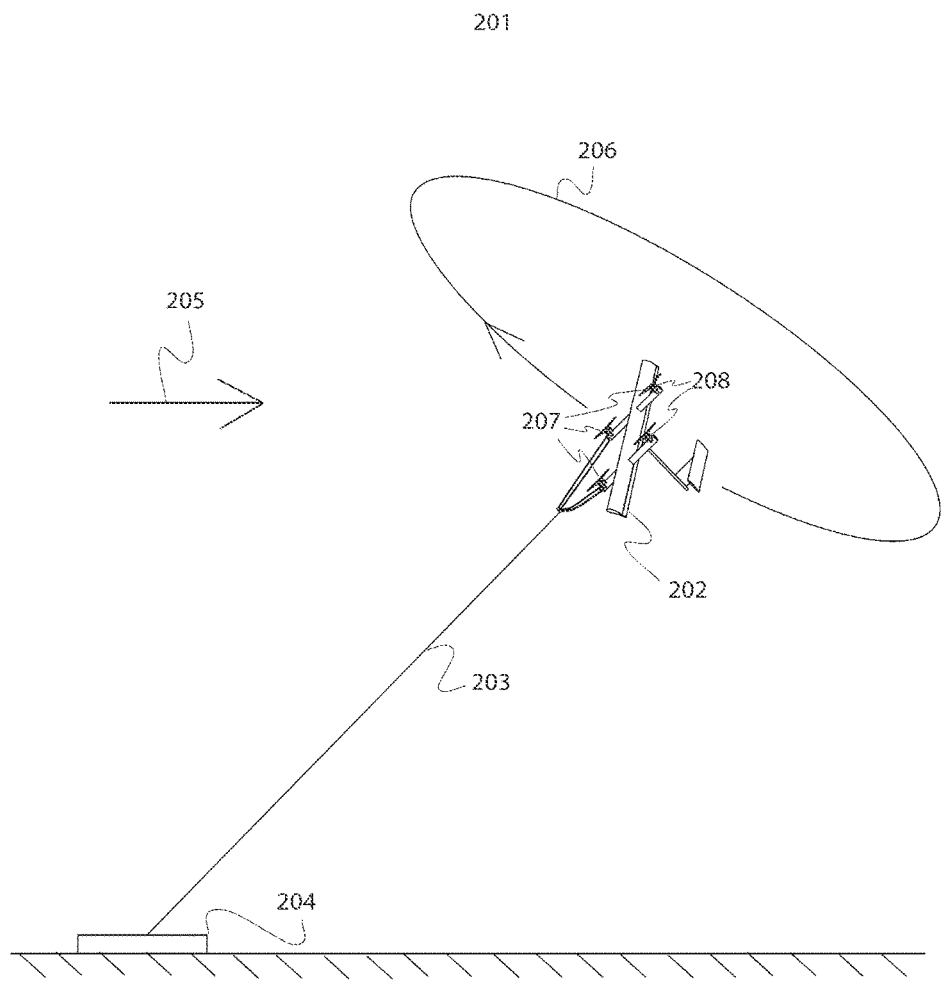
FIG. 2 is a schematic illustrating an embodiment of a crosswind kite system.

FIG. 2 is an illustration of an embodiment of a crosswind kite system 201 comprising a kite 202. The kite 202 is attached to one end of a tether 203, the other end of which is attached to a mooring 204. When in a crosswind mode of flight, the kite 202 is controlled to fly downstream of incoming wind 205 along flight path 206. In the example shown, the kite 202 comprises hybrid rotors 207 connected to motors/generators 208 that provide or extract power from the crosswind kite system 201. In an illustrative example, the speed of the incoming wind 205 may be 10 meters per second, and the apparent wind speed at the kite 202 during crosswind flight along flight path 206 may be in the region of 40-50 meters per second.

In some embodiments, the flight path 206 is a fixed path. In other embodiments, the flight path 206 is varied based on environmental and control variables such as wind speed, wind direction, and desired power output. In yet other embodiments, the flight path 206 emerges from a combination of a physical system and a control strategy that does not explicitly estimate the path.

In some embodiments, the kite 202 comprises hybrid rotors 207 that convert fluid dynamic drag power into shaft rotation power or shaft rotation power into fluid dynamic thrust power. In some embodiments, the hybrid rotors 207 only convert fluid dynamic drag power into shaft rotation power or only convert shaft rotation power into fluid dynamic thrust power. In some embodiments, the hybrid rotors 207 are connected to motors/generators 208 that either convert shaft rotation power into electrical power or convert electrical power into shaft rotation power or are capable of both converting shaft rotation power into electrical power and of converting electrical power into shaft rotation power. In some embodiments, the motors/generators 208 comprise chemical or other engines that convert chemical or other power into shaft rotation power, or convert shaft rotation power into chemical or other power.

In various embodiments, the motors/generators 208 are connected to hybrid rotors 207 in a direct drive configuration, are connected to the hybrid rotors 207 through a magnetic or mechanical gearbox, or are connected to the hybrid rotors 207 through a viscous or fluid dynamic coupling.

The tether 203 comprises high strength materials that convey a force from the kite 202 to the mooring 204. In some embodiments, the tether 203 also comprises electrically conductive materials that convey electrical power to and from the kite. In some embodiments, the tether 203 comprises an aerodynamic or faired shape or surface texture.

In some embodiments, electrical power is transferred to and from the kite 202 over the tether 203. In some embodiments, the kite 202 is supplied with power by means of on-board chemical storage or electromagnetically conveyed power. In other embodiments, the kite 202 is unpowered, and does not comprise on-board hybrid rotors 207.

In various embodiments, the crosswind kite system 202 is used to generate traction forces on the tether 203, or is used to generate shaft rotation and/or electrical power with on-board turbines 207. The power and traction performances of the crosswind kite system 202 scale as $$P = K_1 v_w^3 C_L^3 / C_D^2 \quad \text{(Equation 1)}$$

and, simplifying to ignore power-generating drag, $$T = K_2 v_w^2 C_L^3 / C_D^2 \quad \text{(Equation 2)}$$

respectively, where $K_1$ and $K_2$ are empirical constants, $C_L$ is the system coefficient of lift, $C_D$ is the system coefficient of drag, and $v_w$, is the average wind speed relative to the ground anchor point. Equation 1 may be referred to as the performance metric. The coefficient of lift $C_L$ and the coefficient of drag $C_D$ are defined in the normal manner for aircraft. In some embodiments, the tether 203 is designed to withstand the tensile load at design coefficients of lift and drag and a design wind speed. At higher wind speeds, in some embodiments of the present invention, the aerodynamic coefficients $C_D$ and $C_L$ are modified such that the tensile load on the tether 203 remains bounded to avoid structural failure.

The kite 202 has non-zero mass and non-zero velocity. To follow the flight path 206, the kite 202 must be accelerated substantially towards the instantaneous center of curvature of the flight path, and thus must create sufficient aerodynamic centripetal force (i.e., the sum of the components of lift 206 and of aerodynamic side-force 208 as illustrated in FIG. 2 directed towards the center of curvature of the flight path).

The coefficient of side-force $C_Y$ is defined as the aerodynamic side-force normalized by the wind speed squared, the density of air p and the wing reference area A as follows:

$$C_Y = \frac{Y}{0.5 \rho V_w^2 A}. \quad \text{(Equation 3)}$$

The kite 202 flies at an angle of attack 104 and at an angle of side-slip 105 (as illustrated in FIG. 1). In some embodiments, the kite 202 is asymmetric and has a non-zero coefficient of side-force when flying at zero angle of side-slip. In some embodiments, asymmetric vertical lifting surfaces exist such that the coefficient of side-force on the kite 202 changes as a function of the angle of side-slip at which the kite 202 is flown, in the same way that the coefficient of lift of an aircraft in steady-level flight varies with angle of attack. In some embodiments, the kite 202 is made to follow the flight path 206 primarily through adjustments of the roll angle of the kite 202 relative to the tether 203 in normal wind conditions, and is made to follow the flight path 206 primarily through changes in the coefficient of side-force $C_Y$ of the kite 202 in high wind conditions. In other embodiments, the kite 202 is made to follow the flight path 206 primarily though changes in the coefficient of side-force $C_Y$ in all wind conditions. In some embodiments, changes in the coefficient of lift $C_L$ are additionally used to control the kite 202 to follow the flight path 206. In some embodiments, all three techniques are used at differing levels as a function of wind speed.

Figure 3:
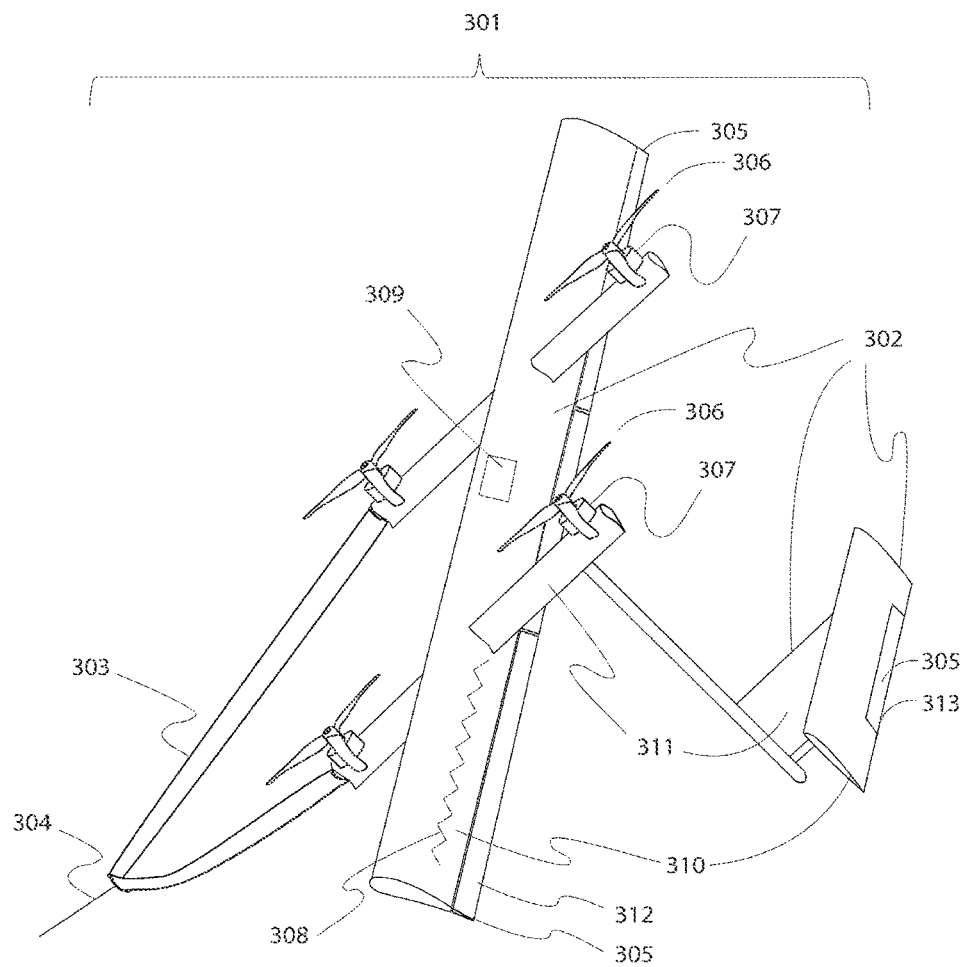
FIG. 3 is a schematic illustrating an embodiment of a kite used in a crosswind kite system.

FIG. 3 is an illustration of an embodiment of a crosswind kite 301. In some embodiments, the kite of FIG. 3 comprises a kite 202 in crosswind kite system 201 in FIG. 2. In some embodiments, the kite 301 comprises a number of lifting surfaces 302 that, in the presence of fluid flow, create an aerodynamic force with a component that is perpendicular to the direction of the flow. In various embodiments the kite 301 comprises bridles 303 that attach the tether 304 to the kite 301, one or several control surfaces 305, hybrid rotors 306 connected to motors/generators 307, flow modifiers 308 and/or one or several control computers 309.

In some embodiments, the tether 304 comprises a shape or surface finish such that the tether drag coefficient is dependent on the Reynolds number or apparent wind speed. In various embodiments, the tether 304 comprises a shape or surface finish such that the tether exhibits a reduced drag coefficient above some cut-off Reynolds number, an increased drag coefficient above some cut-off Reynolds number, or both a reduced drag coefficient above one cut-off Reynolds number and an increased drag coefficient above a different cut-off Reynolds number. In some embodiments, the tether 304 comprises such a surface finish over only a portion of its length. In some embodiments, the shape or surface finish of the tether 304 changes with flight speed or tension in a manner that modifies the drag coefficient of the tether 304. For example, the trailing edge of the tether 304 could comprise a faired or aerodynamic shape incorporating fibers of a high Young's modulus laid in a wavy pattern such that the trailing edge of the tether develops ripples at high tether tensions.

In some embodiments, the bridles 303 comprise a number of distinct tensile elements that distribute the load from the tether 304 over the kite 301. In some embodiments, the bridle attachment points on the kite 301 straddle the pitch and roll centers of moment of the kite 301 such that the bridle 303 provides restoring moments to the pitch and roll orientation of the kite 301. In other embodiments, the tether 304 connects directly to the kite 301. In some embodiments, the bridles 303 constrain the attachment point of the tether 304 to a fixed location relative to the wing. In other embodiments, the bridles 303 constrain the location where the tether 304 connects to the bridles 303 to a line, an arc, or some other curve or region of space relative to the wing. In some embodiments, the bridles 303 comprise a low drag shape. In some embodiments, the bridles 303 comprise a shape that creates an aerodynamic side-force when the kite 301 is flown at a large side-slip angle, such as a shape with an airfoil-shaped cross-section. In some embodiments, the bridles 303 and/or the tether 304 comprise a shape that creates a larger fluid dynamic drag when the kite 301 is flown at a significant side-slip angle, such as an airfoil, oblong, flat or other shape cross-section.

In some embodiments of the kite 301, the lifting surfaces 302 are comprised of horizontal surfaces 310 and vertical surfaces 311. In the presence of relative airflow, the horizontal surfaces 310 produce lift on the pitch plane and the vertical surfaces 311 produce a lifting force on the yaw plane, i.e., aerodynamic side-force. In various embodiments, a component of the lift generated by the horizontal surfaces 310 is the primary motive force of kite 301. In some embodiments, the kite 301 is rolled relative to the tether 303 such that a component of the lift generated by the horizontal surfaces 310 contributes to the turning force of the kite 301. In various embodiments, the lift generated by the vertical surfaces 311 is the primary component of turning force of the kite 301. In high wind flight, the vertical surfaces 311 are used instead of horizontal surfaces 310 to generate the primary turning force, while the orientation of the kite 301 is changed such that the coefficient of lift due to the horizontal surfaces 310 is reduced. In this manner larger deviations in angle of attack may be tolerated on the horizontal surfaces 310 prior to stall or spar failure. In some embodiments, the lifting surfaces 302 are comprised of lifting surfaces in a number of different orientations that serve the same combined purpose of the vertical surfaces 311 and the horizontal surfaces 310.

In some embodiments, the parasitic and induced drag of the horizontal surfaces 310 and the vertical surfaces 311 is determined by the trim angles of attack and sideslip of the kite 301 and by the deflections of the control surfaces 305. In some embodiments, the drag from the horizontal surfaces 310 and the vertical surfaces 311 increases significantly at a range of side-slip angles that are large, which may be seen in high wind conditions, compared to the side-slip angles observed when the crosswind kite system 201 operates in normal wind conditions. In some embodiments, the coefficient of lift of the horizontal surfaces 310 decreases at a range of side-slip angles that are large compared to the side-slip angles observed when crosswind kite systems operate in normal wind conditions. In some embodiments, the aspect ratios of the vertical surfaces 311 are small such that the vertical surfaces 311 generate a large amount of induced drag when generating side-force. In some embodiments, the vertical surfaces 311 are shaped to have a low span efficiency by comprising an irregular chord, span-wise gaps, span-wise slots, or alternating trailing edge deflections. In some embodiments, the vertical surfaces of the motor pylons have asymmetric airfoils such that the vertical surface is adapted for lift in one direction, which may be the center of a circular flight path in some aspects. In some embodiments, a subset of lifting surfaces 302 comprise side-slip dependent lift modifiers 308, which modify the lift and drag of the surfaces which comprise them. In various embodiments, side-slip dependent lift modifiers 308 comprise vortilators, fences, or any other appropriate lift modifiers. In some embodiments, the lift modifiers 308 modify the stall characteristics of a subset of the lifting surfaces 302 as a function of side-slip. In some embodiments, the vertical surfaces 311 comprise through-wing vents or leading edge slats which see little airflow in normal operation but which exhibit a large through flow and a large drag coefficient at large side-slip angles. In some embodiments, the vertical surfaces 311 comprise a subset of control surfaces 305 that, when deflected or actuated, increase the side-force of vertical surfaces 311 at a given angle of side-slip.

Figure 13:
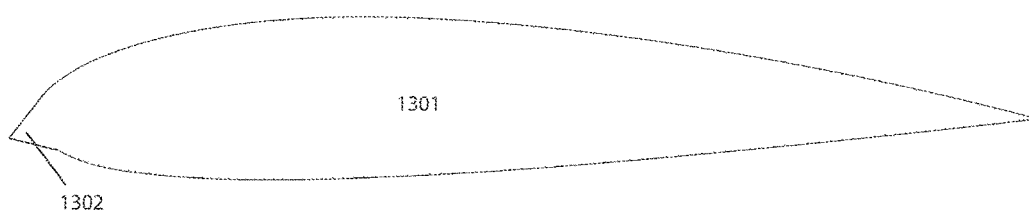
FIG. 13 illustrates a cross-section of a vertical airfoil of a pylon according to some embodiments of the present invention.

In some embodiments of the present invention, as seen in FIG. 13, a pylon might comprise a NACA 2415 airfoil and have zero angle of incidence in normal power generating flight, producing a pylon coefficient of lift of 0.25. At an aspect ratio of 4 and span efficiency of 1, this results in a coefficient of induced drag, referenced to the pylon area alone, of 0.005. If, in high wind flight, the kite is flown at an average sideslip of 7 degrees, the pylons then generate a pylon-referenced coefficient of induced drag of 0.08. In some embodiments, the pylons have about 0.25 of the area of the main wing, resulting in an increase in coefficient of drag of 0.02 referenced to wing area. In some embodiments, the pylons are shaped in a manner which has a very low span efficiency. For instance, the pylons may incorporate large changes in chord over short pylon-spanwise distances, or may incorporate sharp edges near the pylon tips, oriented to be aligned with the flow at kite sideslips, but to be misaligned with the flow at high sideslips. For example, the tip of the pylon may be cut off with a square end. A pylon with a vertical pylon as described above offers an advantage in that induced drag is significantly increased when the kite is flown in sideslip. As the side slip angle is increased in flight in high winds, induced drag increases, moderating the increase in structural loading on the system due to the increase in wind speed.

The pylon airfoil profile may also be modified to produce greater profile drag above a critical angle of sideslip. For example, the pylon profile 1301 may incorporate a leading edge cuff over a portion of the span of the pylon, as depicted in FIG. 13. A cross-sectional profile 1301 of a segment of the pylon, may cover, for example, 20% of total pylon span. The pylon may have a leading edge cuff 1302 with a sharp curvature discontinuity, causing a separation bubble over a segment of the top surface of the pylon cross-section above a critical kite sideslip or critical angle of attack of the pylon cross-section relative to the apparent wind. As the majority of the pylon still utilizes a conventional airfoil cross-section, the added separation and parasitic drag due to the cuffed pylon segments does not dramatically affect stall angle of attack or kite handling. A pylon with profile features as described above offers an advantage in that profile drag is increased when the kite is flown at a significant sideslip angle. As the side slip angle is increased in flight in high winds, profile drag increases, moderating the increase in structural loading on the system due to the increase in wind speed.

The main airfoil, in some embodiments, has an aspect ratio of 25, and operates at a coefficient of lift of 2 in normal power generating flight, and a coefficient of lift of at or above 0.7 in high wind flight. To provide an example, this results in a coefficient of induced drag of between 0.085 and 0.05 referenced to wing area during normal crosswind flight, and a coefficient of induced drag of 0.006 at the low coefficient of lift used in high wind flight. In this example, assume the tether has a coefficient of drag referenced to wing area of 0.05, and a parasitic and profile drag of 0.04 referenced to wing area. This results in a lift to drag of 14 for the airframe, and a performance metric ($C\_L\hat{} 3/C\_D\hat{} 2$) of 400.

In high winds, again neglecting the effects of flightpath geometry, the resulting lift to drag ratio at a coefficient of lift of 0.7 on the main wing is 7, and the performance metric is 40. If, however the added pylon drag due to sideslip previously listed (0.01) and due to change in profile (0.01) are included, the lift to drag becomes 6, and the performance metric becomes 25. In the example given, continued flight of circles becomes difficult at a coefficient of lift of 1.5, due to the requirement for excessive tether roll angle in order to complete the turn (in turn due to the lower aerodynamic force available to counteract centripetal forces). If this is taken as the minimum coefficient of lift of a kite system not incorporating aspects of the present invention in its flight, including turning with side slip, the lift to drag and performance metric of the system are, respectively, 12.6 and 240. Aerodynamic forces increase roughly as the square on incoming windspeed. Thus, if the nominal flight example above uses full allowable flight-loads (20000 Newtons for an 4 square meter wing, for example) in winds of 10 m/s, the example with a minimum coefficient of lift of 1.5 is able to fly in winds no higher than 13 m/s, and the example incorporating multiple aspects of the present invention, with a minimum coefficient of lift of 0.7, is able to flight in winds no higher than 39 m/s. Although in practice embodiments of the present invention may utilize additional features to moderate loads in high wind conditions, one can see that just this aspect allows for a 290% increase in wind capability versus just 30% without this aspect in this exemplary embodiment.

In some embodiments, the kite 301 comprises a plurality of control surfaces 305. The control surfaces 305 modify the lift and drag forces generated by lifting surfaces 302. In various embodiments the control surfaces 305 may comprise flaps, leading edge slats, ailerons, fowler flaps, elevators, lift spoilers, rudders, wing twist actuators or any other appropriate moving surfaces (not all shown in FIG. 3). In some embodiments, the kite 301 is stable, and the trim angle of attack and side-slip of the kite 301 is a function of the deflections of the control surfaces 305. In some embodiments, the kite 301 is unstable and must be stabilized through the use of automatic control, and the trim angle of attack and side-slip of the kite 301 under automatic control is a function of the average deflections of the control surfaces 305.

In some embodiments, the control surfaces 305 are comprised of main wing trailing elements 312, located on the primary horizontal lifting surface, and elevators 313, located on a trailing horizontal lifting surface, such as a horizontal tail. In some embodiments, main wing trailing elements are located in front of the aerodynamic center such that a deflection of the trailing elements 312 leads immediately to an increase in coefficient of lift generated by the kite 301. In some embodiments, the elevators 313 are located far behind the aerodynamic center of the kite 301 and, when deflected so as to generate an increase in coefficient of lift of the kite 301, they momentarily generate a decrease in coefficient of lift. In some embodiments the trailing elements 312 are used by a control process such as the process executed by a control computer 309 to attenuate the high frequency changes in lift due to gusts, while the elevators 313 are used to attenuate the low frequency changes in lift due to gusts. In some embodiments, the trailing elements 312 comprise the secondary or tertiary element of a multi-element airfoil, while in other embodiments the trailing elements 312 comprise a hinged control surface, a flexural control surface, or any other type of control surface on a single element airfoil. In some embodiments fowler flaps may be used as the trailing elements.

In some embodiments, the kite 301 further comprises hybrid rotors 306 connected to motors/generators 307. In some embodiments, the hybrid rotors 306 are the same hybrid rotors as the hybrid rotors 207 in FIG. 2, and the motors/generators 307 are the same motors/generators as the motors/generators 208 in FIG. 2. In various embodiments, the hybrid rotors 306 and the motors/generators 307 act to adjust trim angle of attack and side-slip of the kite 301 through blade pitch control, rotational rate control, position control, torque control, or some other mechanism or algorithm for control. In some embodiments, the kite 301 does not comprise control surfaces 305 and the trim angle of attack and side-slip of the kite 301 are determined by the modulation of the hybrid rotors 306. Modulation of the rotors may include differentiating the load, and thus the drag, of rotors either right/left (yaw), or upper/lower (pitch), or both.

In some embodiments, the kite 301 further comprises a flight control computer 309, which controls the deflections of the control surfaces 305 and the commands to the motors/generators 307 and thus the fluid dynamic forces on the hybrid rotors 306. In some embodiments, the flight control computer 309 operates a control process to choose the control surface deflections and motor/generator commands based on sensor inputs. In some embodiments, the flight control computer 309 is not located on the kite 301, but communicates commands to the kite from some other location. In some embodiments, the control process is not stored in the flight control computer 309 and is loaded from some other location. In some embodiments, the control process changes the trim control surface deflections of the control surfaces 305, the motor/generator commands to the motors/ generators 307, and the angles of attack and side-slip of the kite 301 based on sensed environmental conditions such as wind speed or direction. In some embodiments, the control process gives commands which trims the kite 301 to an angle of side-slip which will maximize a metric of power output magnitude and quality (e.g. minimum variability) when near-design environmental variables are sensed (e.g. nominal design wind speed), and gives commands which trims the kite 301 to an angle of side-slip which will maximize a metric that combines power output magnitude and power output quality and kite structural reliability when off-design environmental variables are sensed (e.g. high wind speeds). In various embodiments, the control process gives commands that trim the kite 301 to a large angle of side-slip, which increases the drag, reduces the maximum lift and changes the stability characteristics of the kite 301. In some embodiments, the kite 301 may fly at the same angle of side-slip in low and high wind conditions.

Figure 4:
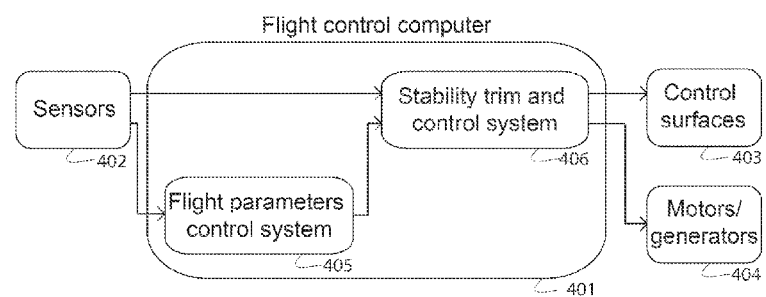
FIG. 4 is an information flow illustrating an embodiment of a process for the control of a crosswind kite system through extreme wind conditions.

FIG. 4 illustrates an embodiment of a process for the control of a crosswind kite system. The flight control computer 401 (e.g. flight-control computer 309 in FIG. 3) comprises a processor and memory to store and implement a process for the control of a kite (e.g. kite 202 of FIG. 2 or kite 301 of FIG. 3). The flight control computer 401 takes as input signal(s) from sensor(s) 402 which may comprise data sensed on the kite and/or at other locations. The flight control computer 401 uses signals from sensors 402 to determine the deflections to request of control surfaces 403 (e.g. control surfaces 305 in FIG. 3), and, on those embodiments of kites comprising hybrid rotors, to determine the performance to request of motors/generators 404 (e.g. motors/generators 208 in FIG. 2 or motors/generators 307 in FIG. 3). The process implemented by the flight computer 401 comprises a flight parameters control system 405, which determines a flight path (e.g. flight path 206 of FIG. 2), the desired deflections of the control surfaces 403, and the control gains for the stability trim and control system 406. The process implemented by the flight computer 401 further comprises a stability trim and control system 406.

The stability trim and control system 406 takes as inputs signals from the sensors 402 and the outputs of the flight parameters control system 405. If the flight computer 401 of the crosswind kite system is not dynamically stable without automatic control, the stability trim and control system 406 implements a feedback loop that stabilizes those modes of the crosswind kite system that are not dynamically stable. In normal operating wind conditions, the flight parameters control system 405 commands deflections of the control surfaces 403 that result in a high operational efficiency (e.g. high power generation as a function of wind speed on a system designed for power generation). In some embodiments, in high winds, the flight parameters control system 405 commands trim deflections of the control surfaces 403 that directly yield a higher fluid dynamic drag on the kite, or result in a side-slip angle or angle of attack that yields a higher drag coefficient. In those embodiments that comprise hybrid rotors, the flight parameters control system 405 may send command signals to the motors/generators 404 that directly yield a higher fluid dynamic drag on the kite, or result in a side-slip angle or angle of attack that yields a higher drag coefficient. In some embodiments, the flight trim is adjusted passively by the structure or geometric shape of the kite, and is not necessarily adjusted by a flight parameters control system such as the flight parameters control system 405. For example, the shape of the kite may be such that, when regulated to fly at lower angles of attack, the kite passively adjusts its orientation to a higher angle of side-slip; or the kite may deform under loads in a manner that yields higher system drag, a lower coefficient of lift, and/or a higher trim side-slip angle.

Figure 5:
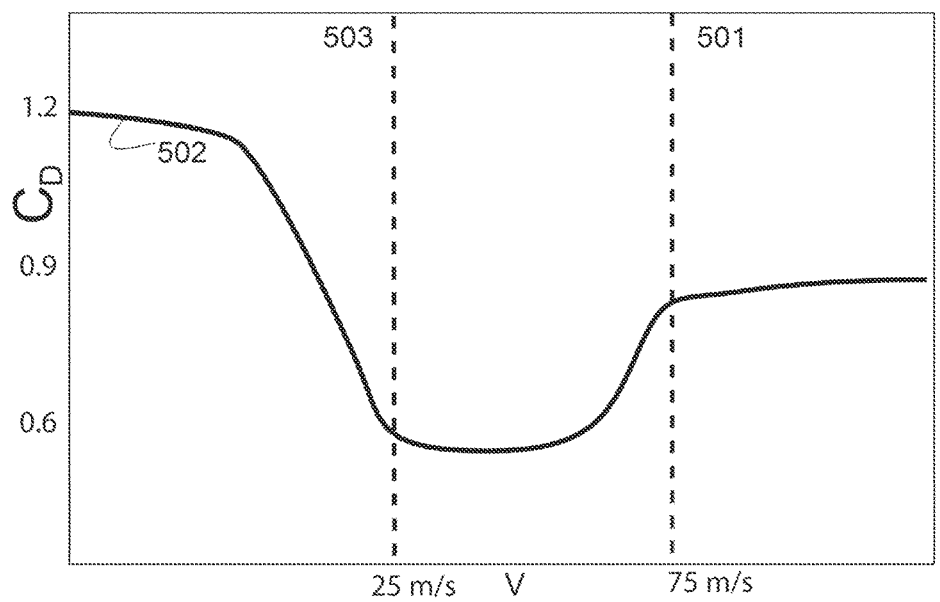
FIG. 5 is a graph illustrating the coefficient of drag of an embodiment of a tether for a crosswind kite system, as a function of Reynolds number.

FIG. 5 is a graph illustrating the tether drag coefficient 502 as a function of the local apparent wind speed and associated Reynolds number (Re) for an embodiment of a tether for a crosswind kite system (e.g. tether 203 of FIG. 2 or tether 304 of FIG. 3). The tether drag coefficient 502 is the component of the force from a tether acting on a kite in the direction opposite to the direction of flight, as normalized to the same area as that used in determining the lift, drag, and side-force coefficients of the kite. Above a cut-off local apparent wind speed 501, the tether drag coefficient 502 increases, reducing the flight speed of the associated crosswind kite system and thus the system tension relative to the wind speed and to the system tension that would be exhibited if drag coefficient 502 were to stay constant. In some embodiments, tether drag coefficient 502 also increases below a cut-off local apparent wind speed number 503. In an exemplary embodiment, the tether coefficient of drag remains relatively high, and then dips beginning at a wind speed of approximately 15 m/s. The trough of the plotted coefficient of drag may be very near the nominal operational apparent wind speed, which may be 20 m/s. In high apparent wind speeds on the tether of approximately 80 m/s and higher, the coefficient of drag may have come up to a higher level. Such a set of performance characteristics for a tether provide an advantage of a low coefficient of drag at nominal wind speeds, allowing for more efficient power generation using the turbine driven generators of the airborne system, while also having a higher coefficient of drag at high wind speeds, wherein the increased drag moderates the structural loads that would otherwise be higher without this increase in drag.

Figure 6A:
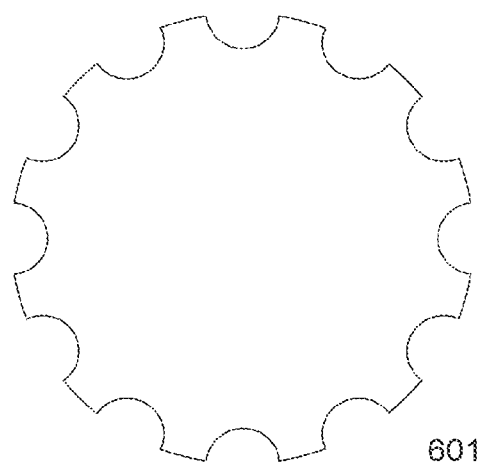
FIGS. 6A-D are schematic drawings illustrating cross sectional shapes of various embodiments of a tether for use in a crosswind kite system.
Figure 6B:
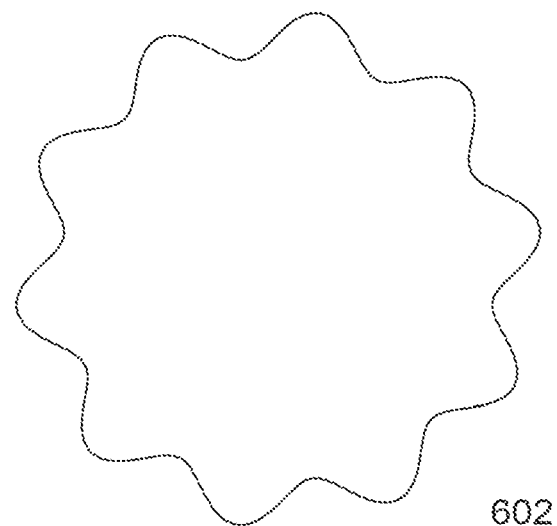
Figure 6C:
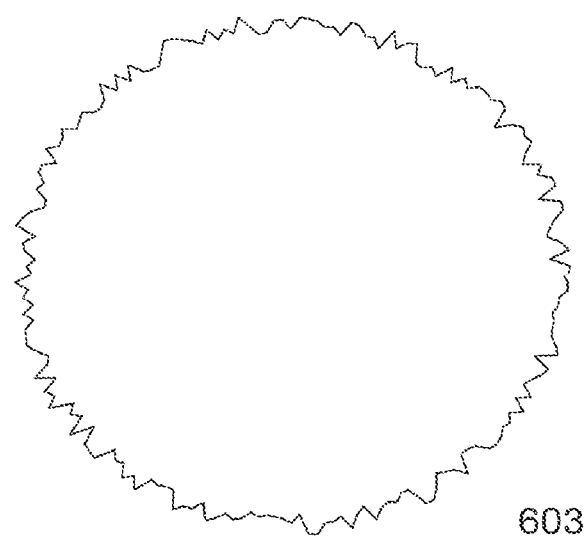
Figure 6D:
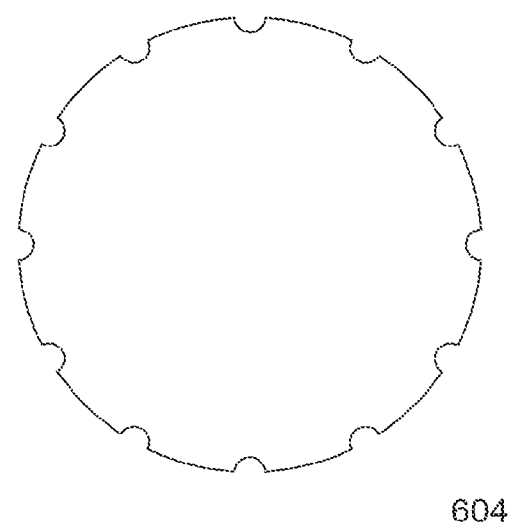

FIGS. 6A-D illustrate the cross-sectional shapes of various possible embodiments of the tether for a crosswind kite system, such as the tether 203 of FIG. 2, the tether 304 of FIG. 3, or the tether whose measured drag coefficient profile is presented in FIG. 5. In various embodiments, the tether comprises a surface cross-sectional shape 601 with a number of hemispherical cuts along its circumference, a surface cross-sectional shape 602 of oscillating radius, a surface cross-sectional shape 603 with surface imperfections such as those introduced by sand blasting, or any other appropriate surface cross-sectional shape. In some embodiments, the tether is of some other shape that results in an increase in coefficient of drag above a cut-off Reynolds number or apparent wind speed. In some embodiments, the tether deforms above a cut-off flight speed or above a cut-off tension such that the modified shape results in an increase in the tether drag coefficient. Examples of such tethers may be seen in U.S. patent application Ser. No. 13/185,507 to Vander Lind, which is hereby incorporated by reference in its entirety. In higher wind speeds and at higher flight speeds, a larger segment of the tether of a crosswind kite system experiences apparent winds above any given cut-off speed. In some embodiments, the tether comprises a surface cross-sectional shape which exhibits a reduction in coefficient of drag above some speed or Reynolds number (e.g. shape 601 or shape 603). In some embodiments, the tether comprises such a cross-sectional shape only over a segment of the tether near the kite, such that the increased apparent wind on the tether near the ground attachment point does not contribute to a reduction in tether drag coefficient as the inertial wind speed or kite speed increase. FIG. 6D illustrates a preferred embodiment of a tether cross-sectional shape for utilization on a 400 kW rated power airborne wind turbine. The shape 603 seen in FIG. 6C has a cross-sectional diameter of 25 mm, and incorporates 12 half-round scallops 604 of depth 2 mm each, about the circumference. The scallops spiral along the length of the tether at an angle of 12 degrees from the tension-wise axis of the tether. The length-averaged transition to turbulent airflow over the surface of the tether shape as seen in FIG. 6D changes location along the tether profile as a function of apparent wind speed incident on tether shape 604, such that in normal operating conditions (apparent wind speed of 20-50 m/s incident on tether shape 604), the diameter-referenced coefficient of drag of tether shape 604 is near its minimum value, for example, near the value indicated by wind velocity 503 in FIG. 5 (for example, a coefficient of drag between 0.5 and 0.8). In higher apparent wind speeds incident on tether shape 604, the diameter-referenced coefficient of drag of tether shape 604 increases, for example to the value indicated at wind velocity 501 in FIG. 5 (for example, a coefficient of drag between 0.8 and 1.1).

Figure 7A:
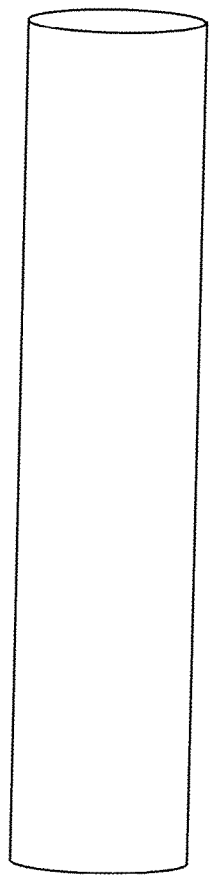
FIGS. 7A-C are schematic drawings illustrating shapes of various embodiments of sections of a bridle for use in a crosswind kite system.
Figure 7B:
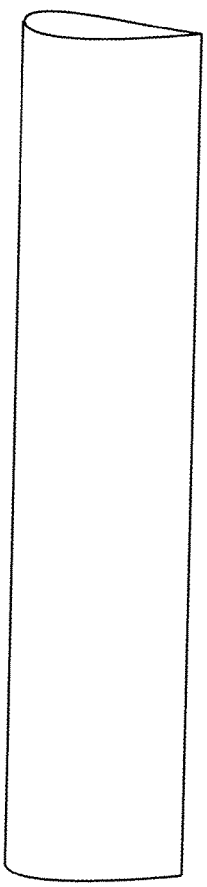
Figure 7C:
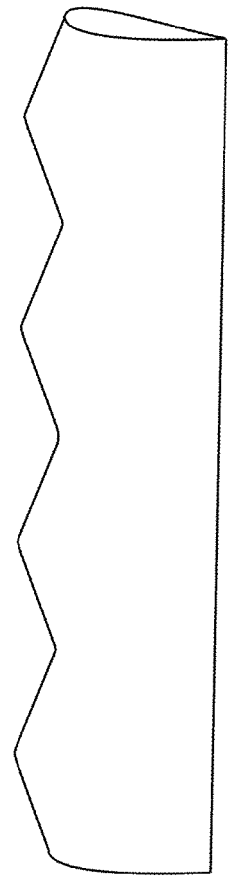

FIGS. 7A-C illustrate several possible embodiments of bridle shapes for a crosswind kite system, (e.g., the shapes of bridles 303 in FIG. 3). In some embodiments the bridle shapes comprise an elliptical cross section such as the bridle shape 701 seen in FIG. 7A, or airfoil cross section such as the bridle shape 702 seen in FIG. 713, such that when the kite flies at a non-zero angle of side-slip the bridles exhibit a non-zero lift force and an increased drag force. In some embodiments, the bridle shapes 702 in embodiments as seen in FIG. 7B comprise an airfoil shape which is tailored to stall at a determined angle of side-slip, such that the drag of the bridle shapes 702 increase above that determined angle of side-slip. In some embodiments, to avoid stall flutter, the bridle shapes 702 comprise an airfoil shape which does not exhibit a large change in pitching moment through stall. In some embodiments the chord of the bridle shape is constant, such as for bridle shapes 701 and 702 of FIGS. 7A and 713, respectively. In other embodiments, such as in the bridle shape 703 seen in FIG. 7C, the chord of the bridles varies along the length of the bridle such that the bridle stalls at a higher angle of attack, has an increased induced drag, or exhibits a smaller variability in section lift at stall due to localization of stalled flow.

Figure 8:
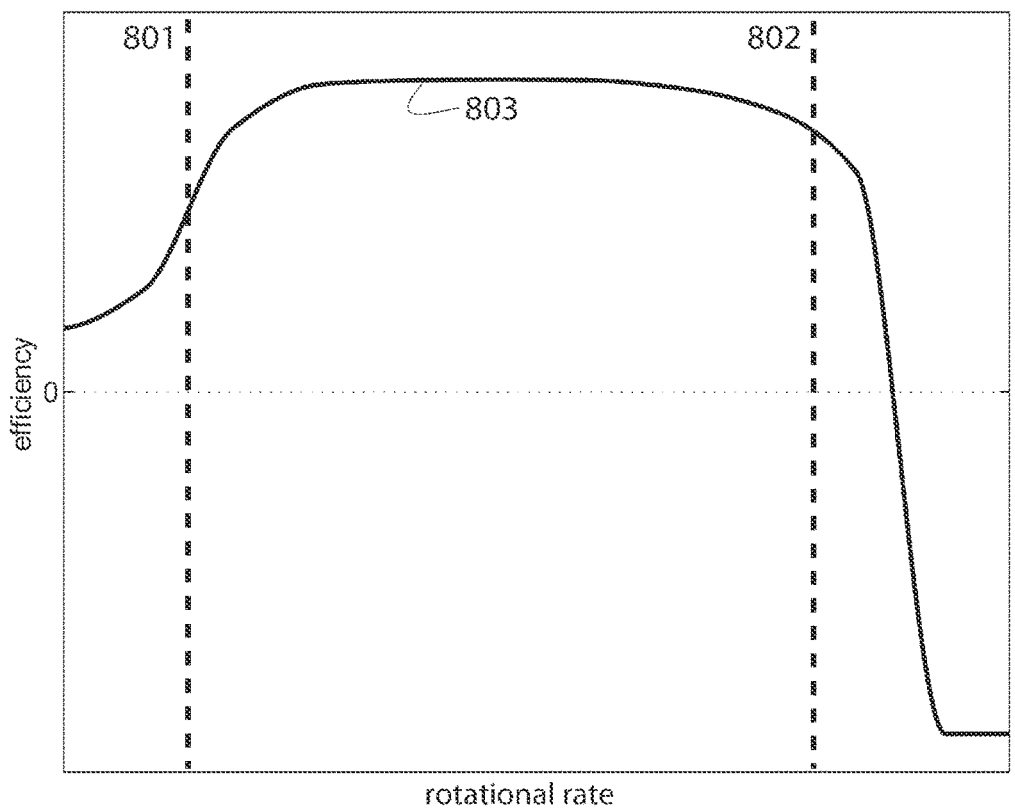
FIG. 8 is a graph illustrating the efficiency of an embodiment of a hybrid rotor for use on a crosswind kite system, as a function of rotation rate.

FIG. 8 is a graph illustrating the efficiency of an embodiment of a hybrid rotor as a function of its rotational rate (e.g. hybrid rotor 207 of FIG. 2 or hybrid rotor 306 of FIG. 3). Vertical lines 801 and 802 are the operating rotational rates for one embodiment of a hybrid rotor at which the rotor produces equivalent amounts of shaft rotation power. Data line 803 is the predicted efficiency of one embodiment of a hybrid rotor at a single relative airspeed over a range of rotor rotational rates. At high efficiencies, a smaller drag is imposed on the kite system for a given amount of shaft rotation power produced, resulting in an increase in kite traction and power production performance. At lower efficiencies, a greater drag is imposed on the kite system for a given amount of shaft rotation power produced, resulting in a decrease in kite traction and power production performance. In some embodiments of a crosswind kite system comprising hybrid rotors (e.g. crosswind kite system 201 and hybrid rotors 207), the rotational rates of some or all of the hybrid rotors are controlled to operate at a low efficiency point when the crosswind kite system is operating in high wind conditions, with a goal of increasing drag. In some embodiments of a crosswind kite system, the hybrid rotors have variable pitch blades, and are controlled to operate at a low efficiency combination of rotational rate and blade pitch when the crosswind kite system is operating in high wind conditions. In some embodiments of a crosswind kite system, the hybrid rotors are designed to stall or otherwise significantly increase section drag over a large segment of each blade at certain operating points, so as to increase the drag which may be produced in high wind speeds.

Figure 9:
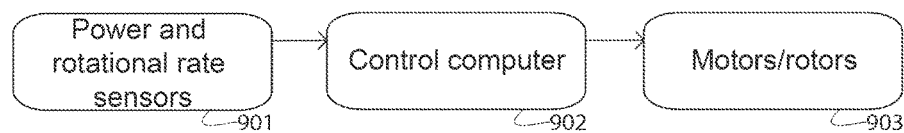
FIG. 9 is an information flow illustrating two embodiments of a process for the control of the motors/generators of a crosswind kite system.

FIG. 9 is a flow diagram illustrating an embodiment of a process for controlling the generators connected to the hybrid rotors on a crosswind kite system. In some embodiments, the generators are the generators 208 of FIG. 2 and the hybrid rotors are the hybrid rotors 207 of FIG. 2. In some embodiments, the torque of generators controlled by the process of FIG. 9 (e.g. generators 208) is controlled based on a measurement of the generator rotational rate and the generator power output. Torque is calculated based on an averaged measurement of rotational rate and a near-instantaneous measurement of the generator power output. In some embodiments, the length of time over which the measurement of rotational rate is averaged is varied as a function of wind speed, or some other external measurement, or is varied based on power output. In some embodiments, the length of time over which the measurement of rotational rate is averaged is fixed over all of the operating conditions. In some embodiments, the length of time over which the measurement of rotational rate is averaged is shorter when the generator is using electrical power than when the generator is generating electrical power. In some embodiments, rotor blade pitch is commanded at stage 903, in addition to generator torque. In some embodiments, power and rotational speed sensors 901 comprise all power and rotational speed sensors on the kite, while in other embodiments other sensors are used. In some embodiments, the control computer 902 gives commands to the motors/rotors 903 that minimize a function of total power output or power output variation of the kite and the measured or estimated loads on the hybrid rotors (e.g. commands which attenuate power output variation as much as possible while maintaining motor control authority and response speed within specific bounds). In some embodiments, the control computer 902 gives commands to the motors/rotors 903 which minimize power output variation while in the kite power system is in the crosswind mode of flight but gives commands which maximize response speed while the kite power system is in other modes of flight such as the hovering mode of flight. In some embodiments, the control computer 902 acts as a speed controller for the motors/rotors 903 in low wind conditions, and as a torque or power controller for the motors/rotors 903.

Figure 10:
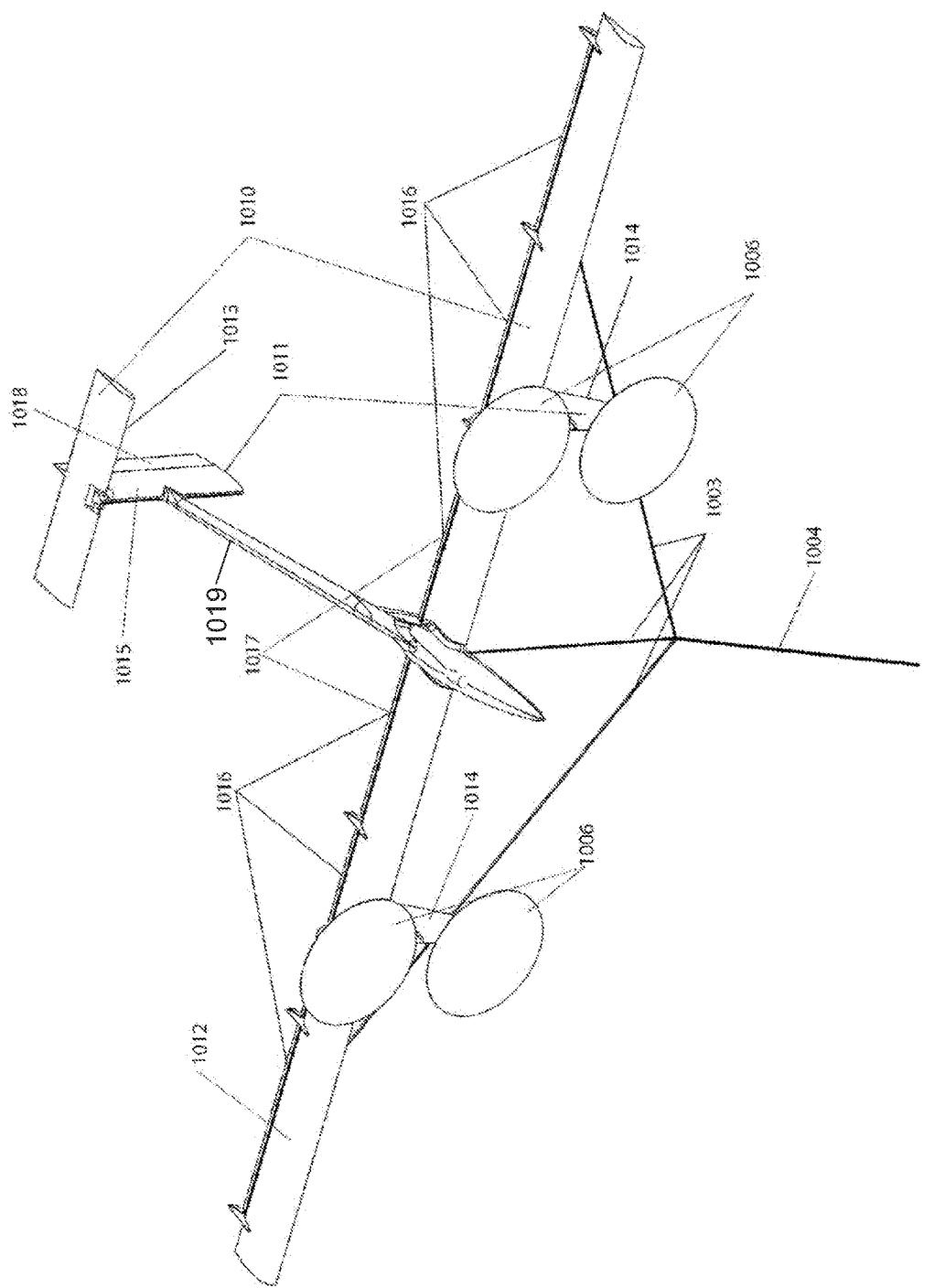
FIG. 10 is perspective view of an airborne tethered flight system according to some embodiments of the present invention.

FIG. 10 is an illustration of an embodiment of a kite adapted for crosswind flying as part of an airborne tethered flight system according to some embodiments of the present invention. The kite 1001 comprises horizontal surfaces 1010 and vertical surfaces 1011. The horizontal surfaces 1010 comprise a horizontal main wing 1012 and a horizontal tail wing 1013. A tail boom 1019 extends rearwardly from main wing 1012 and is coupled to tail wing 1013 via vertical tail 1015. The horizontal main wing 1012 comprises a multi-element airfoil in which the primary element has a chord of roughly 0.75 of the total foil chord, and the trailing element 1016 has a chord of roughly 0.25 of the total foil chord. The trailing element is comprised of six segments that extend along all or most of the span of the horizontal main wing 1012 and are all actuated such that the stall angle of attack, stall coefficient of lift, coefficient of drag, and coefficient of moment of the horizontal main wing 1012 may be modified. In high wind conditions, the trailing element of the horizontal main wing 1012 is deflected such that the stall angle of attack over the center segment of the horizontal main wing 1012 is decreased drastically, while that of the outboard segments of the horizontal main wing 1012 is decreased only marginally, thus changing the stall behavior of the kite 1001 to be more gradual. The trailing element of the horizontal main wing 1012 is actuated based on the sensed tension on the tether 1004 and the estimated lift generated by the main wing 1012, in a manner which attenuates high frequency changes in tether tension or airfoil lift. The horizontal tail wing 1013 comprises an actuator which pivots the entirety of the horizontal tail wing 1013. The actuator is used to actuate the horizontal tail wing 1013 in response to a low-pass filter of sensed tension on the tether 1004 and estimated lift on the main wing 1012. The vertical surfaces 1011 comprise motor pylons 1014 and a vertical tail 1015. The motor pylons 1014 and the vertical tail 1015 have low aspect ratios and low span efficiencies, such that the kite 1001 has an increased coefficient of drag when the kite 1001 is flown at a large sideslip angle. In an exemplary embodiment as depicted, a side slip angle of greater than 5 degrees results in a 20% increase in kite coefficient of drag, at a lift coefficient of 1 as normalized to wing area, at nominal kite flight velocity. The kite 1001 further comprises hybrid rotors 1006, which are of a variable pitch design. In high wind conditions, the hybrid rotors 1006 are actuated to a low blade pitch and a high blade rotational rate such that the majority of energy extracted by the rotors 1006 is converted into system drag. The hybrid rotors 1006 are mounted on motor pylons 1014 such that the wake of the hybrid rotors 1006 does not interact with the boundary layer of the horizontal main wing 1012. The kite 1001 further comprises bridles 1003, which connect and carry load from the tether 1004 to the main wing 1012. The bridles 1003 are arranged so as to distribute load across the span of the horizontal main wing 1012 and thus reduce bending moment experienced by the horizontal main wing 1012. In a representative embodiment, the wingspan of the main wing 1012 is 8 meters, with a wing area of 4 square meters. The chord length, inclusive of the trailing element 1016, 0.52 meters. The mass is 55 kg. The system flies with a tether length of 150 meters with a flight pattern radius of 50 meters. The maximum tension for the tether is 19 kN. The minimum flight speed is 20 m/s and the maximum flight speed is 100 m/s.

The tether 1004 comprises a cylindrical cross section with scalloped cuts as in shape 601, as is suitable for storage on a drum. The tether 1004 only comprises scalloped cuts over the 30% of the tether 1004 closest to the kite 1001, as shape 601 exhibits an increase in coefficient of drag below a critical Reynolds number. The drag profile of the tether 1004 as a function of flight speed is similar to that depicted in FIG. 5, with the minimum apparent flight speed of the kite 1001 corresponding to Reynolds number 503, and high-winds flight speed of the kite 1001 corresponding to Reynolds number 501. The kite 1001 further comprises a control computer 1009, which stores and runs the control process for the control of the kite 1001. The control process on the control computer 1009 operates the motors/generators 1007 with a speed-control loop while the kite 1001 is flying in low wind conditions, and operates the motors/generators 1010 with a current-control loop when the kite 1001 is flying in high wind conditions.

Figure 11:
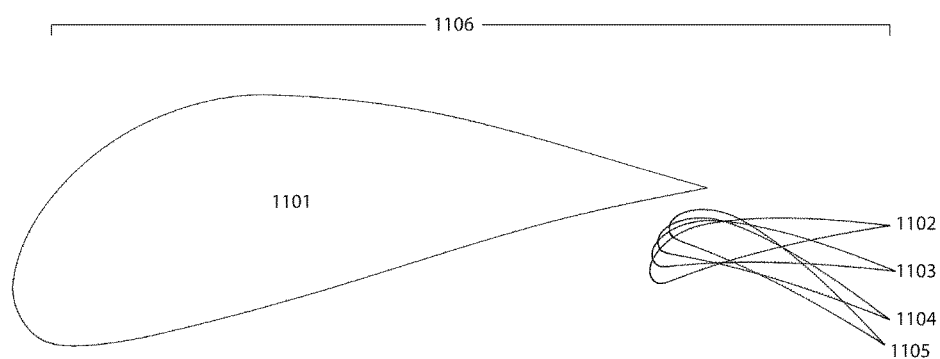
FIG. 11 is representational side view of a multi-element airfoil according to some embodiments of the present invention.

The main wing 1012 comprises actuators which deflect the main wing trailing elements 1016 about a pivot point in a manner similar to 'fowler' or multi-element flaps, as depicted by trailing element angular deflections 1102-1105 in FIG. 11. In ground-referenced wind speed of 10 meters per second (m/s) or less, the trailing elements 1016 are deflected to a time-averaged deflection of 0 degrees (as depicted by trailing element deflection 1104 in FIG. 11), corresponding to a configuration of the main wing 1012 which generates near a maximum amount of lift, and the kite 1001 is controlled by deflection of the horizontal tail surface 1013 to a time-averaged angle of attack of 0 degrees and by deflection of the rudder 1018 to a time-averaged sideslip of 0 degrees. In wind speeds over 12 m/s, the trailing elements 1016 are deflected upwards to a position such as that indicated by trailing element deflection 1103 in FIG. 11. The time-average upward deflection of the trailing elements 1016 is increased roughly linearly with ground-referenced wind speed from 0 degrees at 12 m/s to −30 degrees at 25 m/s. In some embodiments, some subset of trailing elements, 1017, of the trailing elements 1016 are deflected upwards at a higher rate as wind speed increases. For instance, the subset of trailing elements 1017 may be deflected to a time-averaged upward deflection linearly increasing to −45 degrees, between 12 m/s and 25 m/s ground-referenced wind speed. In such embodiments, the section of the main wing 1012 near trailing elements 1017 is fully stalled in high winds. In other embodiments, the time-averaged deflections of the trailing elements 1016 are roughly equal between all control surfaces. In some embodiments, only a portion of the trailing elements 1016 comprise actuators and the other trailing elements 1016 are of fixed deflection. In some embodiments, the trailing elements 1016 are also used for steering and roll control, and turning commands added to those flap-type commands described herein. In some embodiments, different sets of flaps are deflected to different angles as dictated by changes in the airfoil profile along the span of the main wing 1012.

In some embodiments, the kite 1001 comprises a main wing 1012 which uses a single element airfoil. Rather than comprising trailing airfoil elements such as the trailing elements 1016 of the above mentioned embodiment, the main wing 1012 may comprise flaps located and utilized in the same manner as trailing elements 1016. In a preferred embodiment, main wing 1012 comprises a multi-element airfoil generating a time-averaged coefficient of lift greater than 1.5, as referenced to the main wing planform area in wind speeds at or below the design-power wind speed. As maintenance of finite wing coefficient of lift, as referenced to main wing area, of greater than 1.5 is difficult to achieve with a single airfoil element, a multiple element airfoil is preferred.

FIG. 11 is a diagram depicting multi-element airfoil 1106 according to some embodiments of the present invention, for example as may be use in the multi-element main wing 1012 depicted in FIG. 10. In the embodiment depicted, the multi-element airfoil 1106 comprises a main airfoil element 1101 and a trailing airfoil element 1104. The multi-element airfoil 1106 comprises an actuator which receives control signals from a flight control computer to deflect the trailing element 1104 to various deflections, for example −15 degrees (as depicted by trailing element deflection 1103), −30 degrees (1102), and +10 degrees (1105). As employed as a main wing such as main wing 1012, on a kite such as kite 1001, trailing element 1104 is actuated to a time-average deflection of 0 degrees (1104) at ground-referenced wind speeds at or below 12 m/s. In higher ground-referenced wind speeds, trailing element 1104 is deflected upwards. For example, trailing element 1104 may be deflected upwards to −30 degrees (depiction 1102) in winds of 25 m/s or greater.

Figure 12:
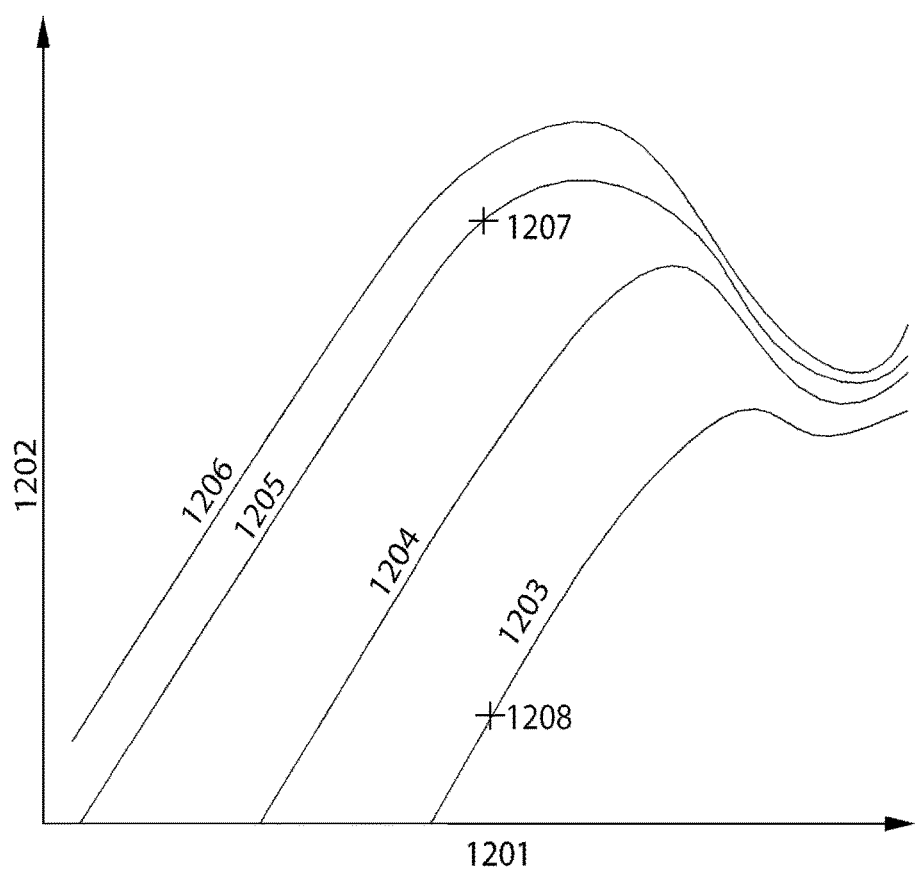
FIG. 12 is a graph of the relationship between angle of attack and Coefficient of Lift for various settings of a multi-element airfoil.

FIG. 12 is a diagram depicting a plot of the coefficient of lift generated by a multi-element airfoil, such as the multi-element airfoil 1106 depicted in FIG. 11, or the multi-element airfoil 1012 depicted in FIG. 10. Coefficient of lift is plotted on the vertical axis 1202 relative to angle of attack, on the horizontal axis 1201. The Coefficient of lift curves 1203, 1204, 1205, and 1206 correspond to flap deflections −30, −15, 0, and 10 degrees (for example, trailing element deflections 1102, 1103, 1104, and 1105 respectively seen in FIG. 11). An airborne wind turbine in normal or low wind conditions as depicted in FIGS. 1 and 2, flies with a main wing trailing element deflection of 0 degrees, as depicted as trailing element 1104 in FIG. 11 and lift curve 1205 in FIG. 12. In high winds, for example a ground-referenced wind speed of 30 m/s, the trailing element is deflected as depicted in 1102 in FIG. 11 and as lift curve 1203 in FIG. 12. In lift curve 1203, the maximum lift coefficient of the multi-element airfoil is reduced. The reduction in coefficient of lift with regard to angle of attack, and the ability to control this coefficient of lift downward when desired in high wind conditions, provides another aspect that allows the airborne flight system to moderate structural loading during flight in high wind conditions. Additionally, the lift at a given angle of attack of the kite at large upward (negative) trailing element deflections is reduced, allowing the kite, such as kite 1001 to fly with similar incidence of rotors, such as rotors 1006, to the apparent wind, at low ground-referenced wind speeds (for example, 0-10 m/s), as at high ground-referenced wind speeds (for example, 20-40 m/s), which has the effect of reducing variable and structurally fatiguing structural loads on the hybrid rotors. Because the main wing may lie substantially near the aerodynamic center of the kite, the changes in coefficient of lift on the main wing can be achieved directly through actuation of the main wing trailing element(s), unlike changes in coefficient of lift achievable using a trailing tail, which must create a negative change in kite coefficient of lift prior to inducing a change in angle of attack which increases overall kite coefficient of lift.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An airborne tethered flight system adapted for flight in high winds, said system comprising:
    a base unit;
    a tether having a first end attached to the base unit and a second end attached to a kite; wherein said kite comprises:
    a main wing;
    a tail wing, and
    a tail boom attached to said main wing on a first end, said tail boom coupled to said tail wing on a second end;
    a plurality of vertical pylons attached to the main wing, said pylons comprising vertical airfoils adapted to provide lift;
    turbine driven generators mounted on the vertical airfoils attached to the main wing; and
    an additional vertical airfoil extending between the tail boom and tail wing.

2. The airborne tethered flight system of claim 1 wherein said vertical airfoils comprise asymmetric airfoils, wherein said asymmetric airfoils are adapted to provide lift in a direction that is the same.

3. The airborne tethered flight system of claim 1 wherein said tether comprises an external profile having helical grooves.

4. The airborne tethered flight system of claim 1 wherein said main wing comprises:
    a multi-element airfoil, said multi-element airfoil comprising:
    a main airfoil; and
    a plurality of trailing elements, said trailing elements coupled to said main wing, said trailing elements adapted to rotate relative to said main airfoil, said trailing elements adapted to alter a coefficient of lift of said multi-element airfoil.

5. The airborne tethered flight system of claim 1, wherein one or more of the vertical airfoils includes a rudder to control an angle of attack of the vertical airfoils.

6. The airborne tethered flight system of claim 5, wherein a rudder is attached to the additional vertical airfoil.

7. The airborne tethered flight system of claim 1 further comprising a control system, said control system comprising flight control instructions for moderating structural loads on said flight system during cyclical flight in high winds by controlling control surfaces on said kite, said flight control instructions comprising:
    instructions for commanding the kite to fly in a substantially circular flight path;
    instructions for reducing the lift of said kite; and instructions for increasing the drag of said kite.

8. The airborne tethered flight system of claim 7 wherein said instructions for reducing the lift of said kite comprise instruction for adjusting the angle of said trailing elements of said multi-element airfoil.

9. The airborne tethered flight system of claim 7 wherein said instructions for increasing the drag of said kite comprise ruddering said kite, thereby increasing the drag of said vertical airfoils.

10. The airborne tethered flight system of claim 1, wherein the additional vertical airfoil also extends beneath the tail boom.

11. A method for controlling a tethered airborne flying system, said method comprising the steps of:
    providing an assessment of a structural load on the flying system while the flying system is in flight, wherein said flying system comprises:
    a base unit;
    a tether having a first end attached to the base unit and a second end attached to a kite; said kite comprising:
    a main wing;
    a tail wing, and
    a tail boom attached to said main wing on a first end, said tail boom coupled to said tail wing on a second end;
    a plurality of vertical pylons attached to the main wing, said pylons comprising vertical airfoils adapted to provide lift;
    turbine driven generators mounted on the vertical airfoils attached to the main wing; and an additional vertical airfoil extending between the tail boom and tail wing; and
    moderating the structural load on the flying system in response to the assessment of the structural load on the flying system by operating a rudder positioned on one or more of the vertical airfoils.

12. The method of claim 11 wherein said step of providing an assessment of the structural load on the flying system comprises the step of monitoring a tension of the tether.

13. The method of claim 11 wherein said step of moderating the structural load on the flying system comprises the step of:
    reducing a coefficient of lift of the main wing.

14. The method of claim 11 wherein said step of moderating the structural load on the flying system comprises the step of:
    increasing the drag of the flying system.

15. The method of claim 14 wherein said step of increasing the drag of the flying system comprises the step of turning the kite using rudder control adapted to increase an angle of attack of the vertical airfoils.

16. The method of claim 13 wherein the step of reducing the coefficient of lift of the main wing comprises the step of deflecting trailing elements on the main wing upwards.

17. The method of claim 11, wherein the additional vertical airfoil also extends beneath the tail boom.

18. The method of claim 11, wherein the rudder is positioned on the additional vertical airfoil.

19. The method of claim 11, wherein said tether comprises an external profile having helical grooves.

* * * * *